March 5, 1940.   C. A. GRIESEDIECK   2,192,262
EMERGENCY CUT-OUT FOR AUTOMOBILE IGNITION CIRCUITS
Filed May 27, 1938   2 Sheets-Sheet 1
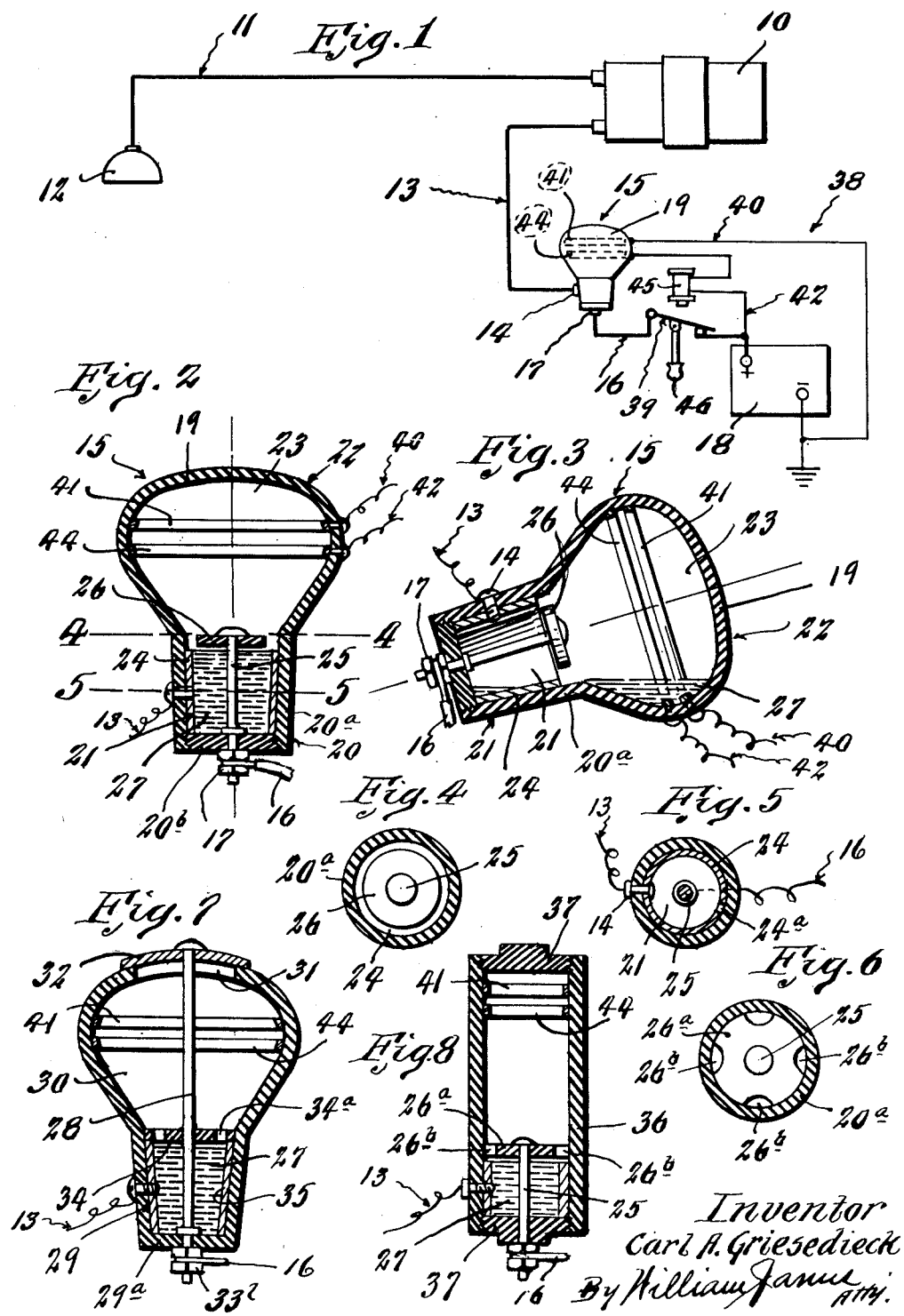
Inventor
Carl A. Griesedieck
By William James
Atty.

March 5, 1940.   C. A. GRIESEDIECK   2,192,262
EMERGENCY CUT-OUT FOR AUTOMOBILE IGNITION CIRCUITS
Filed May 27, 1938   2 Sheets-Sheet 2
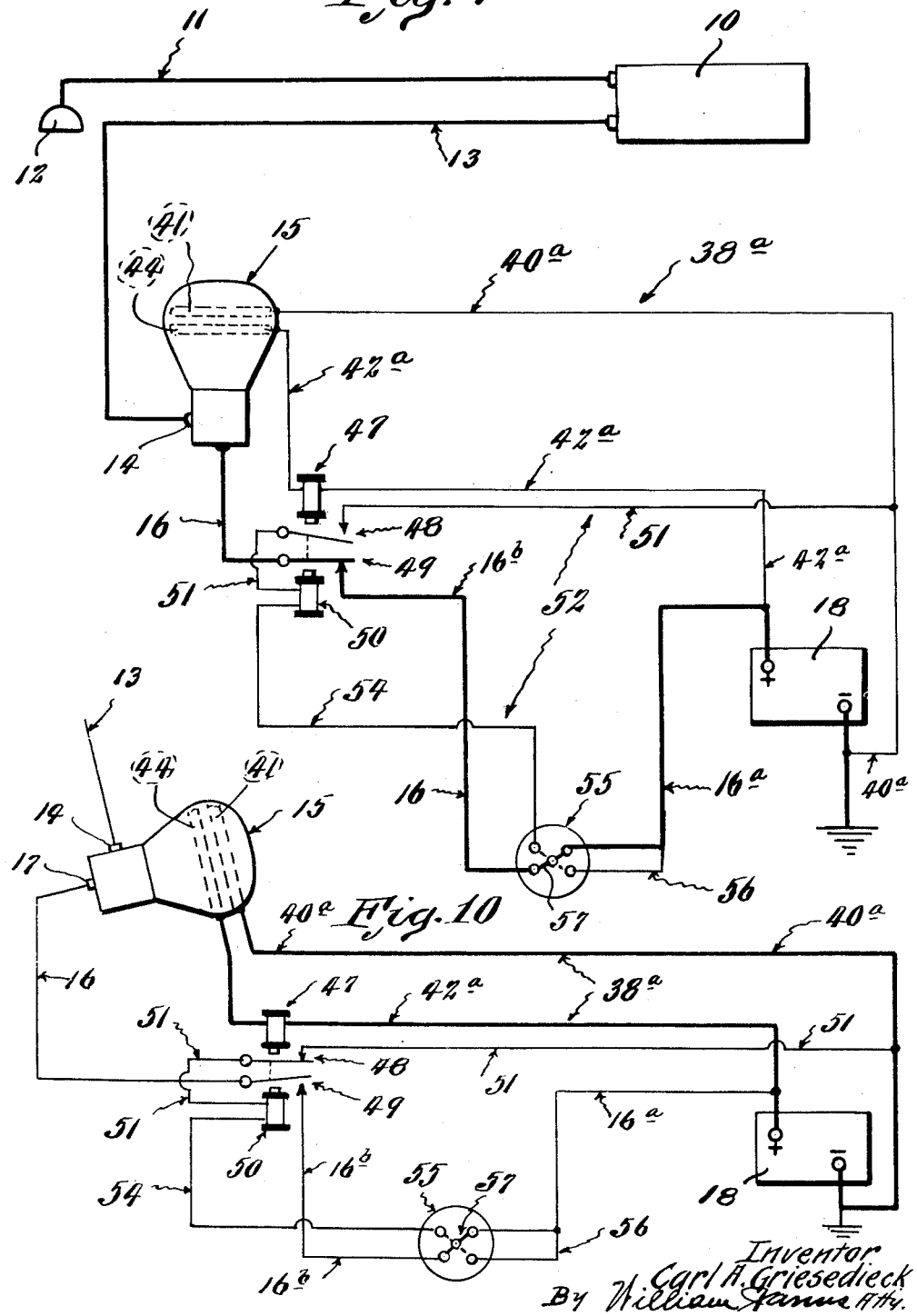

Patented Mar. 5, 1940

2,192,262

UNITED STATES PATENT OFFICE 2,192,262

EMERGENCY CUT-OUT FOR AUTOMOBILE IGNITION CIRCUITS

Carl A. Griesedieck, St. Louis, Mo.

Application May 27, 1938, Serial No. 210,354

10 Claims. (Cl. 123—146.5)

This invention relates to emergency cut-outs for automobile ignition circuits.

In an automobile accident when the car is upset or turned on one side there is often danger of fire due to the spilled gasoline being set on fire by the electric sparks produced by the ignition circuit. Generally the driver and other occupants of the car are too excited or even injured and will not or cannot turn off the ignition circuit immediately after the accident.

One of the main objects of the invention is to provide a simple and efficient device for automatically opening the ignition circuit when the car is turned over or on one side or occupies a dangerous angular position.

Another object of the invention is to provide an emergency cut-out for automobile ignition circuits wherein the connection between spaced-apart contacts is obtained by a suitable conducting liquid or mobile body which is confined in a chamber comparatively small in cross sectional area and is prevented from splashing from said chamber and moving away from one or both of said contacts when the car turns a corner or drives over uneven or rough road, thereby preventing said ignition circuit from being disabled during normal driving operations of said car.

Another object of the invention is to provide an emergency cut-out in which the conducting liquid is contained in a comparatively small chamber formed in the lower end of a vertically disposed container in engagement with a pair of spaced-apart contacts arranged in said chamber and which is adapted to drain into a larger chamber formed in the upper end of said container when said container is tilted from its vertical position past a predetermined angular position.

With these and other objects in view, my invention consists in certain novel features of construction and arrangement of parts hereinafter more fully described and claimed, and illustrated in the accompanying drawings, in which—

Figure 1 is a diagrammatic view showing the cut-out switch in the ignition circuit.

Figure 2 is an enlarged vertical cross section of the switch.

Figure 3 is a similar view but showing the switch in a tilted position.

Figure 4 is a horizontal cross section taken on line 4—4 of Figure 2.

Figure 5 is a horizontal section taken on line 5—5 of Figure 2.

Figure 6 is a modified form of an anti-splasher in my switch.

Figure 7 is a vertical cross section of a modified form of my switch.

Figure 8 is a vertical cross section of another modified form of my switch.

Figure 9 is a diagrammatic view showing my invention used in connection with the main ignition switch.

Figure 10 is a similar view but showing the ignition circuit disconnected by the auxiliary circuit.

Referring by numerals to the accompanying drawings, and particularly to Figure 1, 10 indicates an ignition coil having one terminal connected by a wire 11 to a distributor 12 and having the other terminal connected by a wire 13 to a contact 14 of a switch 15. Another wire 16 extends from contact 17 of switch 15 to a battery 18.

As shown in Figures 2 and 3, this switch 15 comprises a bulbous container 19 of glass, plastic or other suitable non-conducting or insulating material. Under normal driving conditions, the the container 19 occupies a vertical position. The lower end 20 of the container forms a chamber 21 which is comparatively small in cross sectional area, while the upper portion 22 of said container forms a chamber 23 which is of comparatively large diameter. Preferably the side or peripheral wall 20a of chamber 21 slightly tapers downwardly.

A collar or sleeve 24 is fixed in chamber 21 against the wall 20a and terminates a short distance of the upper end of said wall. The collar 24 is preferably split longitudinally, as indicated at 24a, in order to permit the insertion thereof into the tapered chamber 21. A rod 25 extends axially through the chamber 21 and has its lower end extending through and secured to the bottom wall 20b of said chamber 21.

The upper end of this pin or rod terminates slightly above the upper end of wall 20 and has fixed thereto a horizontally disposed disk 26 which forms a partial closure or anti-splasher for the upper end of said chamber 21. Preferably this disk is of smaller diameter than the diameter of the upper end of said chamber 21 so that a clearance exists therebetween. Substantially filling said chamber 21 is a suitable conducting liquid or mobile body, such as mercury 27, which being in engagement with collar 24 and pin 25 maintains electrical connection therebetween.

Contact 14 is arranged on the wall 20 in engagement with collar 24 and establishes connection between wire 13 and said collar. Contact 17 is formed on the lower projecting end of pin 25 and establishes connection between said pin and wire 16. Collar 24 and pin 25 are formed of suitable conducting material, such as copper or brass, and are at all times in spaced-apart insulated relation with each other. The bottom wall 20b of chamber 21 is preferably formed removable and is screw-seated or otherwise secured in position.

When the car turns over or on one side, or occupies a position at a dangerous angle, the switch 15 accordingly occupies upsidedown position or on one side or is disposed at an angle whereby the conducting liquid or body 27 is automatically caused to drain out of chamber 21 into the large chamber 23, thereby breaking the connection between collar 24 and rod 25 and opening the ignition circuit. The position of the disk or anti-splasher prevents splashing of the liquid from chamber 21 into chamber 23 so that said liquid or mercury is maintained under normal conditions in said chamber 21 and in engagement with the contact elements 24 and 25.

In the form shown in Figure 7 the pin 28 extends upwardly from lower chamber 29 through the upper chamber 30 and outwardly through an opening 31 formed in the upper end of said chamber 30. A cap 32 carried by the upper end of said pin 28 closes said opening 31. The lower end of said pin extends downwardly and outwardly through the bottom wall 29a of chamber 29 and is screw-threaded to receive a nut 33 by which said pin is attached in position. In this construction the bottom wall 29a is formed integral with the peripheral wall of chamber 29 and the parts are introduced into the container through the opening 32.

The container forming chambers 29 and 30 may be of bulbous shape, as in the preceding form. The disk 34 may bear on top of the collar 35 and is provided with apertures 34a.

In the form shown in Figure 8 the container 36 is of a tubular shape and one or both end walls 37 may be removable. In all of the forms the container, as well as the removable end walls, are made of insulating material. Only the contact members, such as 24 and 25, are formed of metal and are held in insulated spaced relation with each other and the circuit is completed only when the conducting liquid or body, such as mercury 27, is in contact with both contact members.

The device may be interposed anywhere in the ignition circuit, preferably between the battery and the coil.

It may be attached in position on the car at any suitable point, such as the dashboard or under the hood. Where the container is placed in the wire connection between the battery and the ignition coil the preferred point of attachment would be the strap holding the coil or any other location near said coil.

It is essential that the device is installed in a vertical position on the car, with contact chamber 21 forming the lower chamber and the mercury 27 engaging contacts 24 and 25.

The comparatively small cross sectional area of chamber 21 and its elongation in a vertical plane and the provision of the disk or anti-splasher 26 tend to confine the mercury in said chamber and prevent splashing thereof when driving over rough roads. This eliminates the danger of the mercury moving out of contact with said contact member and the subsequent interruption of the ignition circuit.

The disk or anti-splasher may be of smaller diameter, as shown in Figures 2 to 4, at 26, to provide suitable opening for the mercury to run from one chamber to the other, or it may fit close in the lower chamber, as shown at 26a in Figure 6, and have notches 26b cut in the edge to provide the drain openings, or apertures can be formed in the disk, as shown in Figure 7.

In order to prevent accidental or unauthorized closing of the ignition circuit, when once broken by the tilting of member 15, I provide an auxiliary circuit 38 for operating a switch 39. The latter is interposed in connection 16 of the ignition circuit and is normally closed, when operated into an open position, and breaks said ignition circuit. The circuit 38 consists of a connection 40 extending from the negative pole of the battery 18 to a terminal ring or piece 41 and a connection 42 extending from the positive pole of said battery to a terminal ring or piece 44. A relay or circuit breaker 45 is interposed in connection 42 and when energized operates said switch 39 into an open position to disable the ignition circuit. The rings 41 and 44 are arranged in chamber 23 in spaced insulated relation with each other. Thus with the container 19 disposed in an upright position the circuit 38 is inactive.

When the car overturns or turns on its side the mercury 27 is discharged into chamber 23 and upon coming in contact with rings 41 and 44 completes the circuit 38. This energizes the relay or circuit breaker 45 which operates switch 39 into open position and interrupts the ignition circuit, so that the car cannot be operated when returned to upright position. The switch 39 can be restored to normal position either manually, by a handle 46, shown in Figure 1, or automatically, as shown in Figures 9 and 10. In this form the circuit 38a is provided with relay or circuit breaker 47 which is similar to relay 46 but operates in one direction a pair of coacting switches 48 and 49. These switches are so arranged that when one switch is open the other one is closed. A relay or circuit breaker 50 is arranged in opposed relation to relay 47 and operates said switches 48 and 49 in an opposite direction.

Switch 49 is interposed in connection 16 and controls the ignition circuit, and switch 48 is arranged in a connection 51 of secondary circuit 52 and controls the relay 50. Connection 51 is connected to the negative pole of battery 18 (in the instant case by means of a connection 40a of circuit 38a) and to one terminal of relay 50. The other terminal of said relay is connected by a connection 54 to one of the contacts of a double pole ignition switch 55. The diametrically opposite contact of this switch is connected by a wire 56 to the positive pole of said battery. In the instant case wire 50 is connected to a connection 16a which extends from the positive pole of the battery to one of the main contacts of said switch 55. The other main contact is diametrically oposed to the contact of connection 16a and is connected by a connection 16b to switch 49. A movable contact arm 57 is operated to close the connection either between the stationary contacts of auxiliary circuit 52 or between the contacts of the main ignition circuit. The switch 55 may be of the usual type used for ignition circuits and adapted to be operated by the insertion of a key into a suitable tumbler lock mechanism.

The ignition circuit is controlled in the usual manner, arm 57 being moved into the position shown in full lines in Figure 9 to close the circuit, and into the position shown in dotted lines to open said circuit. Under normal conditions, switch 49 remains closed, while switch 48 remains open, and the ignition circuit is energized as shown in heavy lines in Figure 9.

When the car upsets or turns on one side, the mercury 27 runs from the lower chamber 21 of the container 15 into the upper chamber 23. This breaks the connection between contact members 24 and 25 and opens the ignition circuit. The mercury in upper chamber 23 establishes the connection between rings 41 and 44 and completes the auxiliary circuit 38a, which in turn energizes relay 47. This relay operates switches 48 and 49 into the position shown in Figure 10, wherein switch 48 of circuit 52 is closed, and switch 49 of the ignition circuit is opened.

Thus, even after the car is righted and mercury 27 returned into lower chamber 21 into engagement with contacts 24 and 25, the ignition circuit will be disabled by virtue of the fact that switch 49 has been opened. The ignition circuit will remain disabled until a key is inserted into switch 55 and the arm 57 moved from "on" position to "off" position. When in the off position the arm 57 closes the gap between connections 54 and 56 and completes the circuit 52, thereby energizing relay 50.

The energization of the latter restores switch 49 into a closed position and simultaneously operates switch 48 into an open position to interrupt the circuit 52 of said relay 50. The ignition circuit can now be completed in the usual manner by moving the arm 57 into the "on" position.

To sum up, the ignition circuit includes three switches or points of interruption, two of which, 15 and 59, remain closed under normal conditions, while switch 55 is used to control the ignition circuit. The auxiliary circuits 38a and 52 remain open under normal conditions and do not interfere with the ignition circuit. In case of accident, the ignition circuit is opened between contacts 24 and 25 and the circuit 38a is closed between contacts 41 and 44. Switch 49 is opened and switch 48 closed by relay 47. Thus the ignition circuit is opened at two points in spite of the fact that the ignition switch arm 57 remains in "on" or closing position. After the car is returned to normal position, circuit 38a is open and the contact reestablished between members 24 and 25 of the ignition circuit. However, the latter remains inoperative due to the fact that switch 49 is opened. To restore the ignition circuit it is necessary to operate the switch 55 to "off" position. In this position member 57 closes the connection between connections 56 and 54, switch 48 being closed, the circuit 52 is completed, and relay 50 operated to open switch 48 and close switch 49, thereby permanently opening circuit 52 and restoring ignition circuit 40 to normal. Preferably relay or coil 47 is more powerful than relay or coil 50 so that in case of an accident the ignition switch 55 is turned to "off" position and circuit 52 closed, relay 47 will overcome relay 50 and maintain switch 49 of the ignition circuit in open position.

The provision of the two auxiliary circuits 38a and 52 adds to the safety by maintaining the ignition circuit interrupted even after the car resumes its normal position. It also prevents the restoration of the ignition circuit to normal accidentally or by unauthorized persons.

The device is simple in construction and operation, is inexpensive, and will safeguard the lives as well as property in case of an accident.

While I have disclosed herein the preferred embodiment of my device, it is to be understood that my invention is not limited to the particular forms herein shown and described, as the same may be variously modified without departing from the spirit of my invention.

I claim:

1. In an emergency cut-out for automobile ignition circuits the combination of a pear-shaped vertically disposed container of insulating material having the upper end enlarged in diameter, a pair of stationary contact members disposed in spaced insulated relation with each other in the chamber formed in the lower end of said container, a conducting liquid filling the chamber in said lower end and completing the electric connection between said contacts, and a wire connecting each contact member with one of the terminals of an ignition circuit, said conducting liquid being completely discharged from said lower chamber into said large chamber when said container is tilted a sufficient degree from its normal vertical position to cause the liquid to flow into said enlarged end and out of engagement with said contacts.

2. In an emergency cut-out for automobile ignition circuits comprising the combination of a pear-shaped vertically disposed container of insulating material having its lower end formed with a chamber which is of comparatively small cross sectional area and having its upper end formed of comparatively large cross sectional area, a pair of stationary contact members arranged in said lower chamber in insulated spaced relation with each other, a wire connection extending from each contact member, a conducting liquid in said lower chamber and engaging said contact members to complete the electric connection therebetween, said liquid being displaceable from said lower chamber into said larger chamber when said container is tilted a predetermined degree from its normal vertical position, and a horizontally disposed disk arranged in the upper end of said lower chamber to prevent splashing of said liquid therein, said disk being of smaller diameter than the upper end of said lower chamber to provide a clearance through which said liquid can drain from one chamber to another.

3. In a device of the class described the combination of a pear-shaped vertically disposed member of insulating material, a pair of spaced insulated contacts arranged in the lower end of said member, a wire connection leading from each contact, a conducting liquid body disposed in the lower end of said member in engagement with said contacts, said liquid body being displaceable from engagement with one of said contacts when said member is moved from its normal vertical position, and a horizontally disposed disk arranged in the lower half of said member to prevent splashing of said liquid, said disk being provided with openings to allow the liquid to flow past said disk from one end to the other.

4. In a device of the class described the combination of a pear-shaped hollow member of insulating material, a pair of main spaced contacts in the lower end of said member, an ignition circuit connected in series to said contacts, a conducting liquid body in said tubular member engaging said main contacts and completing said ignition circuit when said member occupies upright position, a pair of auxiliary spaced ring contacts in the enlarged portion of the upper end of said member engageable by said conducting liquid body when said member is tilted, an auxiliary circuit connected in series to said auxiliary contacts, a relay in said auxiliary circuit, and a switch in said ignition circuit normally held closed and operable by the energization of said relay into open position whereby the tilting of said tubular member and the incidental closing of said auxiliary circuit opens said switch in said ignition circuit, and manually operated means for closing said switch.

5. In a device of the class described the combination of a pear-shaped hollow member of insulating material, a pair of main spaced contacts in the lower restricted end of said member, an ignition circuit connected in series to said contacts, a conducting liquid body in said tubular member engaging said main contacts and completing said ignition circuit when said member occupies upright position, a pair of auxliary spaced ring contacts in the upper bulbous end of said member engageable by said conducting liquid body when said member is tilted, an auxiliary circuit connected in series to said auxiliary contacts, a relay in said auxiliary circuit, a switch in said ignition circuit operable by said relay when energized into open position whereby the tilting of said tubular member and the incidental closing of said auxiliary circuit opens said switch in said ignition circuit, and manually operable means for closing said switch in said ignition circuit.

6. In a device of the class described the combination of a hollow bulbous member of insulating material, a pair of main spaced contacts in the lower end of said member, an ignition circuit connected in series to said contacts, a conducting liquid body in said tubular member engaging said main contacts and completing said ignition circuit when said member occupies upright position, a pair of auxiliary spaced ring contacts in the enlarged upper end of said member engageable by said conducting liquid body when said member is tilted, an auxiliary circuit connected in series to said auxiliary contacts, a relay in said auxiliary circuit, and a switch in said ignition circuit manually operable into closed position and operable by the energized relay into open position whereby the tilting of said tubular member and the incidental closing of said auxiliary circuit opens said switch in said ignition circuit.

7. In a device of the class described the combinaton of a pear shaped hollow member of insulating material, a pair of main spaced contacts in the lower end of said member, a main circuit connected in series with said contacts, a conducting liquid body in said tubular member engaging said main contacts and completing said main circuit when said member occupies upright position, a pair of auxiliary spaced contacts in the enlarged upper end of said hollow member and engageable by said conducting liquid when said tubular member is tilted, an auxiliary circuit connected in series with said auxiliary contacts, a relay in said auxiliary circuit energizable by the latter, a main switch in said main circuit operable by said energized relay into open position whereby the tilting of said tubular member and the incidental closing of said auxiliary circuit opens said main circuit, a second auxiliary circuit, a relay in said last mentioned circuit arranged in cooperative relation with said main switch, and a switch in said second auxiliary circuit for closing the same and energizing said relay to bring said main switch into closing position.

8. In a device of the class described the combination of an elongated tubular member of insulating material, a pair of main spaced contacts in the lower end of said member, a main circuit connected in series with said contacts, a conducting liquid body in said tubular member engaging said main contacts and completing said main circuit when said member occupies upright position, a pair of auxliary spaced contacts in the upper end of said tubular member engageable by said conducting liquid when said tubular member is tilted, an auxiliary circuit connected in series with said auxiliary contacts, a relay in said auxiliary circuit energizable by the latter, a main switch in said main circuit operable by said energized relay into open position whereby the tilting of said tubular member and the incidental closing of said auxiliary circuit opens said main circuit, a second auxiliary circuit, a relay in said last mentioned crcuit arranged in cooperative relation with said main switch, a switch in said second auxiliary circuit for closing the same and energizing said relay to bring said main switch into closing position, and an auxiliary switch in said second auxiliary circuit operable by said second relay in conjunction with said main switch to open said second auxiliary circuit simultaneously with the closing of the main switch by said ignition circuit.

9. In a device of the class described, the combination of a hollow pear-shaped member of insulation material, a pair of spaced contacts fixed in the lower restricted end of said member and adapted to be connected in series with the ignition circuit of an automobile, a pair of spaced ring contacts arranged in the widest part of the upper bulbous end of said member and adapted to be connected in series with an auxiliary circuit, and a body of mercury in said pear-shaped member closing the gap between the main circuit contacts when said member occupies upright position and adapted to move into said bulbous portion to close the gap between said ring contacts when said member is tilted a predetermined degree.

10. In a device of the class described, the combination of a hollow pear-shaped member of insulation material, an ignition circuit, a pair of spaced contacts fixed in the lower restricted end of said member and connected in series with said ignition circuit, an auxiliary circuit, an electromagnet in said auxiliary circuit, a pair of spaced ring contacts arranged in the widest part of the upper bulbous end of said member and connected in series with said auxiliary circuit, a body of mercury in said member closing the gap between the ignition circuit contacts when said member occupies upright position and adapted to move into said bulbous portion to close the gap between said ring contacts and close said auxiliary circuit when said member is tilted a predetermined degree, and a switch in said ignition circuit, said switch being manually operable into a closed position and being operable by the energization of said electromagnet into open position.

CARL A. GRIESEDIECK.